United States Patent [19]

Woodson

[11] Patent Number: 4,478,962
[45] Date of Patent: Oct. 23, 1984

[54] BINDER COMPOSITIONS COMPRISING FURFURYL ESTER AND FURFURYL ESTER-FURUYL ALCOHOL COMBINATIONS

[75] Inventor: Wayne D. Woodson, Danville, Ill.

[73] Assignee: CL Industries, Inc., Danville, Ill.

[21] Appl. No.: 510,835

[22] Filed: Jul. 5, 1983

Related U.S. Application Data

[63] Continuation-in-part of Ser. No. 352,376, Feb. 25, 1982, abandoned, which is a continuation-in-part of Ser. No. 306,965, Sep. 30, 1981, abandoned.

[51] Int. Cl.³ .................. C08F 32/06; B22C 11/22
[52] U.S. Cl. .................. 523/144; 523/146; 524/517; 524/541; 524/549; 525/134; 525/162; 525/206; 525/284; 525/518; 526/270
[58] Field of Search .............. 523/144, 146; 524/541, 524/549, 517; 525/284, 134, 162, 206, 518; 526/270

[56] References Cited

U.S. PATENT DOCUMENTS 4,371,648  2/1983  Gardikes et al. .............. 523/144

FOREIGN PATENT DOCUMENTS 660734   4/1963  Canada .............. 523/146
46-39221 11/1972 Japan .............. 523/146

Primary Examiner—Lewis T. Jacobs
Attorney, Agent, or Firm—Maky, Renner, Otto & Boisselle

[57] ABSTRACT

Acid-curable furfuryl alcohol prepolymer binders have improved properties when admixed with a dibasic acid di-ester of the composition

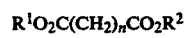

$$R^1O_2C(CH_2)_nCO_2R^2$$

when n is from 1 to 8, $R^1$ is furfuryl, and $R^2$ is furfuryl or methyl. The diesters are preferably added in the amount of 5-35% by weight of total composition. These compositions are particularly useful in the preparation of sand cores and molds for foundry use which have improved strength and hardness. These furfuryl esters are also acid-curable and can be used alone as resin binders.

23 Claims, No Drawings

BINDER COMPOSITIONS COMPRISING FURFURYL ESTER AND FURFURYL ESTER-FURUYL ALCOHOL COMBINATIONS

CROSS-REFERENCE TO RELATED APPLICATION

This patent application is a continuation-in-part of my copending patent application Ser. No. 352,376, filed Feb. 25, 1982 which is a continuation-in-part of Ser. No. 306,965, filed Sept. 30, 1981, both abandoned.

BACKGROUND OF THE INVENTION

1. Field of the Invention

This invention relates to new and useful acid-curing binder compositions comprising furfuryl alcohol prepolymers and/or furfuryl dibasic acid diester compositions for use in the formation of sand cores and molds for foundry operations.

2. Description of the Prior Art

In the foundry industry, sand is coated with resin binders and formed into molds and cores for the production of precision castings. A wide variety of techniques has been developed for the manufacture of sand cores and molds. These involve the hot box technique for mold and core formation; the shell method; the "No-Bake", and the cold-box technique.

In the hot box and shell methods, sand molds and cores are formed by heating a mixture of sand with a thermosetting resin at a temperature of about 150°–320° C. in contact with patterns which produce the desired shape for the mold or core. The resin is polymerized and a core or mold is formed. Procedures of this type are described in Dunn et al U.S. Pat. No. 3,059,297 and Brown et at U.S. Pat. No. 3,020,609.

A particular disadvantage of the hot box and shell methods is the necessity for heating the pattern boxes to 150°–320° C. to polymerize and cure the resin binder. This involves considerable expense and is generally a high cost technique.

The cold box techniques for core and mold formation involve the use of sand mixed or coated with resins which may be cured at room temperature by acid or base catalysis. Acid or base catalysts have been used in liquid, solid or gaseous form. Typical cold box processes are shown in Blaies U.S. Pat. No. 3,008,205; Dunn et al U.S. Pat. No. 3,059,297; Peters et al U.S. Pat. No. 3,108,340; Brown et al U.S. Pat. No. 3,184,814; Robins U.S. Pat. No. 3,639,654; Australian Pat. No. 453,160 and British Pat. No. 1,225,984. Many of these processes involve the use of sulfur-containing acid catalyst such as benzene sulfonic acid, toluene sulfonic acid and the like.

Richard U.S. Pat. No. 3,879,339 discloses coating sand with an organic peroxide and resin, forming into a mold or core and gassing with sulfur dioxide.

A number of U.S. and foreign patents disclose the use of furfuryl alcohol and other furfuryl-substituted compounds in resin polymerization and also the use of dibasic acids and some esters in resin compositions.

Bradley U.S. Pat. No. 2,238,030 discloses the use of dialkenyl esters of dibasic acids in the copolymerization of addition polymers.

Dannenberg U.S. Pat. No. 2,650,211 discloses polymers including dibasic acids as precursors.

Treat U.S. Pat. No. 2,999,829 discloses the copolymerization of furfuryl alcohol and maleic anhydride in the preparation of foundry cores.

Case U.S. Pat. No. 3,312,650 describes resins based on phenol and furfuryl alcohol modified with formaldehyde and treated with an acid catalyst.

Kirkpatrick U.S. Pat. No. 3,244,770 discloses the use of diesters of dibasic acids in phenolic resin compositions.

Bean U.S. Pat. No. 3,248,276 discloses the use of dibasic acids in resin compositions containing condensation-type resins.

Guyer U.S. Pat. No. 3,404,118 discloses the use of furfuryl glycidyl ether in molding resins.

Fitko U.S. Pat. No. 3,600,290 discloses the use of unsaturated esters in resin compositions.

Adkins U.S. Pat. No. 3,725,333 discloses the preparation of foundry molds, etc. using phenolic resins modified with furfuryl alcohol.

Laitar U.S. Pat. No. 4,052,301 discloses resins for sand cores or molds by incorporating furan into a furfuryl alcohol-modified phenolic resin prepolymer.

Anderson U.S. Pat. No. 4,083,817 discloses the acid curing of mixtures of furan-formaldehyde resins with phenolic resins for production of foundry cores and molds.

Stewart et al U.S. Pat. No. 4,176,114 discloses acid curing condensation-type resins comprising a high viscosity polyfurfuryl alcohol alone or in admixture with phenol-formaldehyde or urea-formaldehyde or phenol-urea-formaldehyde precondensate resins, or cocondensates of polyfurfuryl alcohol with said precondensate resins. Such binders are useful for manufacturing sand cores and molds.

Gardikes et al U.S. Pat. No. 4,371,648 discloses binder compositions comprising furfuryl alcohol and a ester of a polyol and resin acid. The binders may also contain modifying agents such as furan polymers, urea-formaldehyde polymers and mixtures thereof.

British Pat. Nos. 626,763 and 922,345 disclose the use of glyceryl esters and other esters of aliphatic dibasic acids in condensation polymers.

The bis(tetrahydrofurfuryl) ester of adipic acid is known but does not undergo condensation type polymerization.

The above noted patents, however, do not consider the problem of the preferential polymerization of furfuryl alcohol when admixed with phenolic and other condensation-type resins and the problem of short bench life, or any way to overcome these problems.

In my copending patent application, Ser. No. 306,965, filed Sept. 30, 1981, dibasic acid diesters of the composition $$R^1O_2C(CH_2)_nCO_2R^2$$

where n is from 1 to 8, $R^1$ is furfuryl, and $R^2$ is furfuryl or methyl, are disclosed as novel compounds and are also shown to be useful modifiers for various condensation-type and acid curable foundry resins. The Diesters are preferably added in the amount of 5–35 percent by weight of total composition. These compositions are particularly useful in the preparation of sand cores and molds for foundry use which have improved strength and hardnss. These furfuryl esters are also acid-curable and can be used alone as resin binders.

SUMMARY OF THE INVENTION

It is one object of the invention to provide a solution to some of the aforementioned problems and provide resins having a more useful bench life and produce cores and molds having greater strength and hardness.

Another object of the invention is to provide resin compositions having the properties and the desired characteristics of furfuryl alcohol-containing resins with improved bench life and working time.

Another object of the invention is to provide a novel class of compounds which is useful in modifying condensation-type resins.

Other objects of the invention will become apparent from time to time throughout the specification and claims as hereinafter related.

The above-stated objects and other apparent objects of the invention are accomplished by novel binder compositions comprising an acid-curable, furfuryl alcohol prepolymer, particularly furfuryl alcohol prepolymers modified with phenolic resin prepolymers, urea-formaldehyde prepolymers and/or furfuryl alcohol-formaldehyde modified phenolic resin prepolymers, admixed with a dibasic acid diester of the composition

where n is from 1 to 8, $R^1$ is furfuryl, and $R^2$ is furfuryl or methyl. The diesters may be added in the amount of 5-50 percent by weight of total composition. These binder compositions are particularly useful in the preparation of sand cores and molds for foundry use which have improved strength and hardness. The diesters are acid curable and can be used alone as resin binders for foundry applications.

The dibasic acid diesters of the composition

where n is from 1 to 8, $R^1$ is furfuryl, and $R^2$ is furfuryl or methyl are not reported in the literature and are novel compounds. These diesters are oily liquids having high boiling points and are particularly useful as resin modifiers, diluents and plasticizers. These diesters are produced by the sodium-catalyzed transesterification reaction of furfuryl alcohol with the liquid dimethyl ester of the $C_3$-$C_{10}$ linear aliphatic dibasic acids at temperatures of about 214°-240° F.

DESCRIPTION OF THE PREFERRED EMBODIMENTS

As noted above, the use of furfuryl alcohol modified resins is well reported in the prior art. The prior art, however, does not treat the problem of preferential polymerization of furfuryl alcohol when admixed with phenolic and other resins or suggest any solution to the problem. In this invention, it has been discovered that a novel class of esters, viz. the furfuryl-methyl esters or the difulfuryl esters of $C_3$-$C_{10}$ linear aliphatic dibasic acids may be mixed with furfuryl alcohol prepolymers, and preferably with furfuryl alcohol prepolymers modified with acid- curable precondensate resins such as phenol-formaldehyde, urea-formaldehyde, furan, and mixtures or copolymers thereof and copolymerized by acid catalysis uniformly. The use of these resin compositions in the preparation of foundry cores and molds results in easier handling of the resins and the sand-resin compositions and improved foundry cores and molds, both in tensile strength and hardness.

The preparation of the novel esters and their properties and use in resin compositions will be discussed separately below.

PREPARATION AND PROPERTIES OF FURFURYL DIESTERS

The difurfuryl esters and mixed methyl-furfuryl esters of aliphatic dibasic acids generally are oily liquids having high boiling points. These diesters can be prepared by the transesterification reacton of furfuryl alcohol with dialkyl, preferably dimethyl esters of the $C_3$ to $C_{10}$ linear aliphatic dibasic acids. Examples of such dibasic acids include malonic acid, glutaric acid, pimelic acid, azelaic acid, suberic acid and sebacic acid. Glutaric acid is a preferred acid. Preferably, the furfuryl diesters of the invention are prepared by reaction of furfuryl alcohol and a dimethyl ester of a dibasic acid in amounts to form either a furfuryl-methyl diester, a difurfuryl diester, and more generally a mixture of the furfuryl-methyl and difurfuryl diesters. The latter mixture is useful as prepared and separation of the components of the mixture is not essential.

The transesterification reaction may be conducted at elevated temperatures up to the decomposition temperature, and is generally conducted at a temperature of from about 100°-125° C. or higher. The reaction is catalyzed by sodium and is preferably conducted in an inert atmosphere such as nitrogen. Methanol is evolved and is removed as the reaction proceeds. The following examples illustrate the preparation of some of the diesters useful in this invention. Unless otherwise indicated, all parts and percentages are by weight.

EXAMPLE I

PREPARATION OF DIFURFURYL GLUTARATE

Furfuryl alcohol is a moderately high boiling liquid, b.p. 340° F. (171° C.). Dimethyl glutarate is a very high boiling liquid, b.p. 417° F. (214° C.).

Furfuryl alcohol (196 parts, 2 moles) and 160 parts (1 mole) of dimethyl glutarate were mixed, and 0.5-0.75 percent of sodium metal was added. The mixture was heated to a temperature in the range from 101°-115° C. under a nitrogen atmosphere. Methanol was evolved and removed as the reaction progressed. After a period of four hours, a waxy solid was obtained. After washing the product with water, the residue was a liquid which was identified as difurfuryl glutarate by gas chromatography and mass spectrometric analysis.

Additional preparations established that the mixed methyl-furfuryl ester of glutaric acid is obtained when the reaction is not run long enough and does not go to completion. When the reaction is carried out with an excess of furfuryl alcohol, e.g., 2:1 mole ratio, the reaction goes to completion sooner, but the excess furfuryl alcohol must be separated from the product. It has also been found that when the reaction temperature is allowed to go too high, there is some decomposition and an appreciable amount of difurfuryl succinate is produced.

EXAMPLE II

PREPARATION OF DIFURFURYL SUCCINATE

Fufuryl alcohol (196 parts, 2 moles) and 146 parts (1 mole) of dimethyl succinate were mixed and 0.5-0.75 percent sodium metal added. The mixture was heated to a temperature in the range from 101°–115° C. under a nitrogen atmosphere. Methanol was evolved and removed as the reaction progressed. After a period of four hours, a waxy solid was obtained. After washing with water, a liquid residue was obtained, which product was identified as difurfuryl succinate.

Additional preparations established that te mixed methyl-furfuryl ester of succinic acid is obtained when the reaction is not run long enough and does not go to completion. It has been found that when the reaction temperature is allowed to go too high, there is some decomposition and an appreciable amount of difurfuryl malonate is produced.

EXAMPLE III

PREPARATION OF DIFUFURYL ADIPATE

Furfuryl alcohol (196 parts, 2 moles) and 174 parts (1 mole) of dimethyl adipate were mixed and 0.5–0.75 percent of sodium metal added. The mixture was heated to a temperatuare in the range from 101°–115° C. under a nitrogen atmosphere. Methanol was evolved and removed as the reaction progressed. After a period of four hours, a waxy solid was obtained. Afterwashing with water, a liquid residue was obtained, which product was identified as difurfuryl adipate.

Additional preparations established that the mixed methyl-furfuryl ester of adipic acid is obtained when the reaction is not run long enough and does not go to completion. It has also been found that when the reaction temperature is allowed to go too high, there is some decomposition and an appreciable amount of difurfuryl glutarate is produced.

EXAMPLE IV

PREPARATION OF DIFURFURYL MALONATE

Furfuryl alcohol (196 parts, 2 moles) and 132 parts (1 mole) of ddimethyl malonate are mixed, and 0.5 –0.75 percent of sodium metal added. The mixture is heated to a temperature in the range from 101°–115° C. under a nitrogen atmosphere. Methanol is evolved and removed as the reaction progressed. After a period of four hours, a waxy solid is obtained. The liquid product obtained after washing with water is difurfuryl malonate.

The mixed methyl-furfuryl ester of malonic acid is obtained when the reaction is not run long enough and does not go to completion. When the reaction temperature is allowed to go too high, there is some decomposition which gives an unsatisfactory result.

EXAMPLES V–VIII

PREPARATION OF OTHER DIFURFURYL ESTERS

The dimethyl esters of other aliphatic dicarboxylic acids are prepared by the same transesterification reaction. Dimethyl pimelate is a very high boiling liquid, b.p. 248° F. at 10 mm. Dimethy suberate is a still higher boiling liquid, b.p. 514° F. Dimethyl azelate boils at 313° F. at 22 mm. Dimethyl sebacate boils at 144° F. at 5 mm. These esters are well known high-boiling oleagenous liquids which have had some use as synthetic lubricants.

When furfuryl alcohol and any of the above-listed dimethyl esters are mixed in 2:1 molar proportions with 0.5–0.75 percent sodium metal, and the mixture is heated to a temperature in the range from 101°–115° C. under a nitrogen atmosphere, the reaction proceeds as described above for the other esters. Methanol is evolved and removed as the reaction progresses. After a period of four hours, a waxy solid is obtained in each case. Water washing any of these products to remove impurities leaves a liquid residue which is a difurfuryl ester of the respective acids.

The following difurfuryl esters are prepared in the above manner

TABLE I

| Example | Description |
|---------|-------------|
| V | difurfuryl pimelate |
| VI | difurfuryl suberate |
| VII | difurfuryl azelate |
| VIII | difurfuryl sebacate |

The mixed methyl-furfuryl esters are obtained when the reaction ia not run long enough and does not go to completion. It has also been found that when the reaction temperature is allowed to go too high, there is some decomposition and some difurfuryl esters of the lower dibasic acids are obtained.

When the reaction is carried out using mixtures of the dimethyl esters of various $C_3$–$C_{10}$ aliphatic dibasic acids in the transesterification reaction, the difurfuryl ester (or the mixed methyl-furfuryl esters) of the various acids are produced.

USES OF FURFURYL DIESTERS AND FURFURYL DIESTER/RESIN MIXTURES

The difurfuryl esters and the mixed methyl furfuryl esters of the dibasic acids described above are compatible extenders for various furfuryl alcohol prepolymers and furfuryl alcohol prepolymers modified with other condensation-type resins such as phenol-formaldehyde, urea-formaldehyde and furan resins. Also, these esters are acid-curable and can be used alone as resin binders for foundry applications.

Furfuryl alcohol previously has been described and used as a binder for sand cores and molds. The furfuryl alcohol prepolymer useful in combination with the above-described furfuryl diesters include furfuryl alcohol, polyfurfuryl alcohol, furfuryl alcohol-formaldehyde condensates, or mixtures thereof. Accordingly, in this specification and in the appended claims, the term furfuryl alcohol prepolymer shall include the above-named materials.

The polyfurfuryl alcohols generally are high viscosity prepolymers. The polyfurfuryl alcohol may be prepared by heating furfuryl alcohol to a temperature somewhat under the boiling point of water under acid conditions in the substantial absence of water to produce the desired viscosity polymer. Alternatively, polyfurfuryl alcohol may be prepared by air blowing or by heating furfuryl alcohol monomer with a minor amount of formaldehyde. Examples of useful polyfurfuryl alcohol prepolymers are found in U.s. Pat. No. 4,176,114.

As mentioned above, the furfuryl alcohol prepolymers also may be a furfuryl alcohol-formaldehyde condensate. Such condensates include polyfurfuryl alcohol-formaldehyde prepolymer. The preparation of the latter prepolymers is described in U.S. Pat. No. 4,176,114.

The binder composition of the invention may comprise a mixture of the furfuryl diesters and a furfuryl alcohol prepolymer of the types described above. The mixtures generally will contain from about 50 to 95 percent by weight of the furfuryl alcohol prepolymer and from about 5 to 50 percent by weight, preferably from about 5 to 35 percent by weight of a furfuryl diester.

In another embodiment of this invention, the binder composition comprises a mixture of the furfuryl diester, a furfuryl alcohol precondensate and at least one other acid-curable condensation type precondensate resin. Among the useful precondensate resins are the phenol-formaldehyde, the urea-formaldehyde and the furan resins together with mixtures and copolymers thereof. When such precondensate resins are included in the binder, they may be present in amounts ranging from 10 to 75 percent by weight based on the weight of the furfuryl alcohol prepolymer present in the binder composition. The preferred binders contain up to 20 percent of such precondensate resins.

The precondensate resins useful in the binder compositions are well known and have been described in many of the patents listed in the background. Phenol-formaldehyde precondensate resins are prepared by the reaction of phenolic compounds with formaldehyde with either basic or acidic catalysts. Basically there are two types of phenolic resins-the resoles and the novolacs formed by basic and acidic catalysis, respectively. When the phenol-formaldehyde reaction is catalyzed with a base, and the mixture contains one or more than one mole of formaldehyde per mole of phenol, the result is a one-step resin, called a resole. The products are mixtures of phenolic alcohols which are widely known and used, and are referred to as "resoles". Upon further heating of these alcohols, the "resoles" tend to polymerize to form a phenolic resin.

On the other hand, the result of an acid catalyzed reaction of less than one mole of aldehyde per mole of phenol is a "novolac" resin. The curve of novolac resins is usually carried out by reaction of the resins with hexamethylenetetraamine. However, resoles can be used to cross-link novolacs.

Urea-formaldehyde precondensate resins are formed by reacting urea with formaldehyde in the presence of acid catalysts under controlled conditions to avoid completion of the condensation reaction to an infusible polymer network. Urea-formaldehyde precondensates are readily available commercially.

The furan precondensates are thermosetting polymers derived from precursors containing a furan ring such as furfuryl or furfuryl alcohol.

Examples of some suitable furan precondensates useful in the binder compositions of the invention include furfuryl alcohol aldehyde polymers (e.g., formaldehyde), urea-aldehyde-furfuryl polymers, and phenolic-aldehyde-furfuryl alcohol polymers. For instance, the furan polymers include reaction products of furfuryl alcohol and of aldehyde, such as formaldehyde. In addition, the aldehyde-furfuryl alcohol reaction product can be modified with varying amounts of reactants, such as phenolic compounds, urea, thiourea, melamine, dicyandiamide, and benzoguanamine. Examples of some suitable aldehydes include formaldehyde, acetaldehyde, propionaldehyde, furfuraldehjyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The phenols employed are generally all phenols which have heretofore been employed in the formation of phenolic resins and which are not substituted at either the two ortho-positions or at one ortho- and para-position, such unsubstituted positions being necessary for the polymerization reaction. Any one, all, or none of the remaining carbon atoms of the phenol ring can be substitued. The nature of the substituent can vary widely, and it is only necessary that the substituent not interfer in the polymerization of the aldehyde with the phenol at the ortho- and/or or para-positions. Substituted phenols employed in the formation of the phenolic resins include: alkyl-substituted phenols, aryl-substituted phenols, cyclo-alkyl-substituted phenols, alkenyl-substituted phenols, alkoxy-substituted phenols, aryloxy-substituted phenols, hydroxy-substituted phenols, and halogen-substituted phenols. Specific examples of suitable phenols include: phenol, resorcinol, 2,6-xylenol, o-cresol, m-cresol, p-cresol, 3,5-xylenol, 3,4-xylenol, 3-ethyl phenol, 3,5-diethyl phenol, p-butyl phenol, 3,5-dibutyl phenol, p-cyclohexyl phenol, 3,5-dimethoxy phenol, and 3,4,5-trimethoxy phenol.

The mole ratios of aldehyde to furfuryl alcohol which can be employed can vary widely. For instance, the furan polymer can be prepared from about 0.4 to about 4 moles of furfuryl alcohol per mole of aldehyde, and preferably from about 0.5 to about 2 moles of furfuryl alcohol per mole of aldehyde.

The furan polymer which can be employed in the present invention can be any of the various furan polymers which are known to be suitable for foundry purposes. Examples of such furan polymers include those obtained from about 1 mole of phenol, about 0.2 to 2 moles of furfuryl alcohol, and about 1 to 3 moles of formaldehyde, such as described in U.S. Pat. No. 3,312,650. In addition, U.S. Pat. Nos. 3,222,315 and 3,247,556 describe various urea-modified furan resins which can be employed for the purposes of the present invention. The furan polymers are generally prepared by polymerization in the presence of an acid catalyst.

The furan resins are prepared by partially polymerizing formaldehyde and furfuryl alcohol in the pesence of an acid catalyst, arresting the polymerization at an intermediate stage by neutralizing the acid catalyst, to thereby form a furan prepolymer.

The binder compositions of this invention are cured by acid catalysts which may be mixd with the binder prior to forming and shaping of an aggregate.

Examples of some suitable acid catalysts include inorganic acids, such as phosphoric acid, hydrochloric acid; and organic acids, such as the organic sulphonic acids, including benzene sulphonic acid, toluene sulphonic acid, xylene sulphonic acid, cumene sulphonic acid and cresol sulfonic acid. Mixtures of acids can be employed when desired.

The amount of acid catalyst employed is usually about 5 to about 75 percent by weight, and preferably about 20 to about 50 percent by weight based upon the total weight of the binder combination. Alternatively, curing of the binder compositions can be effected by includng an oxidizing agent in the binder which will react with sulfur dioxide to form a curing agent. This procedure is described in U.S. Pat. Nos. 3,879,339 and 4,176,114. Useful oxidizing agents include peroxides and hydroperoxides, and a particular advantage of the process is improved shelf life of the binder composition until contacted with sulfur dioxide.

In one preferred embodiment of the invention, acid-curable molding compositions are prepared which comprise a major amount of a solid particulate material and a minor amount of the binding compositions of this invention and an acid catalyst.

A variety of solid particulate materials can be utilized in the molding compositions of this invention. The choice of particulate material will depend, in part, on the intended use. Among the particulate materials which can be used as fillers in the compositions of the invention include all materials containing a high proportion of silica such as siliceous sand, refractory materials, granular metal oxides such as zirconium oxides, and abrasive products such as carborundum, emery, quartz, garnet, aluminum oxide, silicon carbide, etc.

Other materials may be included in the compositions of the invention to provide additional desirable results. For example, coupling agents for improving the bond between the binder and the particulate materials and to improve the ability of the composite to return its original properties after prolonged aging and/or exposure to moisture. Examples of coupling agent known in the art include the silanes and titanates. Chemically, the coupling agents are hybrid materials that possess the functionality of an organic reactive group at one end of the molecule and the inorganic alkoxysilane or alkoxytitanate functionality at the other. Typical organofunctional groups found in the silanes include the vinyl, chloroalkyl, epoxy, methacrylate, amine and styrylamine. The silane coupling agents known in the art are particularly useful in the filled composition of the invention. When preparing an ordinary sand-type foundry shape, the solid particulate material employed has a particle size large enough to permit sufficient porosity in the foundry shape to permit escape of volatiles from the shape during the casting operation. The term "ordinary sand-type foundry shapes" as used herein refers to foundry shapes which have sufficient porosity to permit escape of volatiles from it during the casting operation. Generally, at least about 80 percent and preferably about 90 percent by weight of aggregate employed for foundry shapes has an average particle size no smaller than about 150 mesh (Tyler screen mesh). The aggregate for foundry shapes preferably has an average particle size between about 50 and about 150 mesh (Tyler screen mesh). The preferred aggregate employed for ordinary foundry shapes is silica sand wherein at least about 70 weight percent, and preferably at least about 85 weight percent of the sand is silica. Other suitable aggregate materials include zircon, olivine, alumino-silicate sand, chromite sand and the like.

When preparing a shape for precision casting, the predominant portion, and generally at least about 80 percent of the aggregate, has an average particle size no larger than about 150 mesh (Tyler screen mesh), and preferably between 325 mesh and 200 mesh (Tyler screen mesh). Preferably at least about 90 percent by weight of the aggregate for precision casting applications has a particle size larger than 150 mesh and preferably between 325 mesh and 200 mesh. The preferred aggregates employed for precision casting applications are fused quartz, zircon sands, magnesium silicate sands such as olivine, and alumino-silicate sands.

Shapes for precision casting differ from ordinary sand-type foundry shapes in that the aggregate in shapes for precision casting can be more densely packed than the aggregate in shapes for ordinary sand-type foundry shapes. Therefore, shapes for precision casting must be heated before being utilized to drive off volatizable material present in the molding composition. If the volatiles are not removed from a precision casting shape before use, vapor created during casting will diffuse into the molten melt, since the shape has a relatively low porosity. The vapor diffusion would decrease the smoothness of the surface of the precision case article.

In molding compositons, the sold particulate constitutes the major constituent and the binder constitutes a relatively minor amount. In ordinary sand-type foundry applications, the amount of binder is generally no greater than about 10 percent by weight and frequently within the range of about 0.5 to about 7 percent by weight based upon the weight of the solid particulate. Most often, the binder content ranges from about 0.6 to about 5 percent by weight based upon the weight of the solid particulate in ordinary sand-type foundry shapes.

In molds and cores for precision casting application, the amount of binder is generally no greater than about 40 percent by weight and frequently within the range of about 5 to 20 percent by weight based upon the weight of the solid particulate material.

The following examples illustrate the utility of the binder and molding compositions of the invention unless otherwise indicated, all parts and percentages are by weight.

MOLDING COMPOSITIONS WITH DIFURFURYL GLUTARATE

EXAMPLE 1

A molding resin composition was prepared by mixing 20 percent of liquid difurfuryl glutarate (Product of Example I) with 80 percent of a phenol formaldehyde resin prepolymer. A foundry-grade sand was mixed with a benzene sulfonic acid catalyst in the amount of 45 percent of the resin composition to be added. The catalyst is a solution of 80% of the sulfonic acid, 10% methanol and 10% water. Then, 1.25 percent of the sand, of the 80/20 resin-ester mixture was added to the sand and catalyst and thoroughly mixed.

The resin composition-sand mixture was formed into test biscuits, simulating a foundry core or mold, and allowed to cure for 78 minutes at about 78° F. (26° C.).

The test biscuits had a tensile strength of 196 lbs. after 24 hours as compared with a tensile strength of 161 lbs. for a control produced under the same conditions using the same phenolic resin prepolymer without the difurfuryl ester. Substantially the same results are obtained using slightly greater amounts of the mixed methyl-furfuryl glutarate ester.

Other catalysts can be used in forming the test biscuits which are customarily used in curing sand cores and molds. Examples include the aromatic sulfonic acids such as toluene sulfonic acid, exylene sulfonic acid, and mixtures thereof, either alone or diluted with water and/or methanol or other diluents. Sometimes fluoboric acid or sulfuric acid may be added.

EXAMPLE 2

A molding resin composition is prepared by mixing 35 percent of the liquid difurfuryl glutarate obtained in Example I with 65 percent of a phenol formaldehyde resin prepolymer. A foundry-grade sand is mixed with a benzene sulfonic acid catalyst in the amount of 45 percent of the resin composition to be added. The catalyst is a solution of 80% of the sulfonic acid, 10% methanol and 10% water. Then, 1.25 percent of the sand of the 65/35 resin-ester mixture is added to the sand and catalyst and thoroughly mixed.

The resin composition-sand mixture is formed into test biscuits, simulating a foundry core or mold, and allowed to cure for 80 minutes at about 76° F. (25° C.).

The test biscuits have tensile strengths after 24 hours which are better than the tensile strength of a control produced under the same conditions using the same phenolic resin prepolymer without the difurfuryl ester. The tensile strength is somewhat less than in Example 2, but is substantially better than the control. Substantially the same results are obtained using slightly greater amounts of the mixed methyl-furfuryl glutarate ester.

In this particular example, when larger amounts of the ester are used, e.g., 40 percent and higher, the test results are poorer than the controls. However, when lesser proportions of the ester are used, down to 5 percent, results are obtained which are better than the controls. While the range of 5–35 percent of the difurfuryl esters is preferred, a much wider range may be used where the desired function is that of a diluent or plasticizer in the ester/resin composition.

EXAMPLE 3

A molding resin composition is prepared by mixing 25 percent of the liquid difurfuryl glutarate of Example I with 75 percent of a furan modified phenol formaldehyde resin prepolymer.

A foundry-grade sand is then mixed with a toluene sulfonic acid catalyst in the amount of 45 percent of the resin composition to be added. The catalyst is a solution of 80% of the sulfonic acid, 10% methanol and 10% water. Then, 1.25 percent of the sand of 75/25 resin-ester mixture is added to the sand and catalyst and thoroughly mixed.

The resin composition-sand mixture is formed into test biscuits, simulating a foundry core or mold, and allowed to cure for 85 minutes at about 75° F. (24° C.).

The test biscuits have tensile strengths after 24 hours which are better than the tensile strength of a control produced under the same conditions using the same furan modified phenolic resin prepolymer without the difurfuryl ester. The tensile strength is somewhat less than in Example 1, but is substantially better than the control. Substantially the same results are obtained using slightly greater amounts of the mixed methyl-furfuryl glutarate ester.

Other catalysts can be used in forming the test biscuits which are customarily used in curing sand cores and molds, as noted in Example 1.

EXAMPLE 4

A molding resin composition was prepared by mixing 20 percent of the liquid difurfuryl glutarate of Example 1 with 80 percent of a phenol formaldehyde resin prepolymer.

A foundry-grade sand is then mixed with about 0.5 percent methyl ethyl ketone peroxide as a catalyst precursor. Then, 1.25 percent of the sand of 80/20 resin-ester mixture is added to the sand and peroxide and throroughly mixed.

The resin composition-sand mixture is formed into test biscuits, simulatng a foundry core or mold, and gassed with sulfur dioxide for about 0.5-5 seconds at a temperature of from room temperature to 85°-90° F. (29°-32° C.).

The test biscuits have tensile strengths after 24 hours which are better than the tensile strength of a control produced under the same conditions using the same phenolic resin prepolymer without the difurfuryl ester, and also better than a furan modified phenolic resin having about the same furfuryl content.

EXAMPLE 5

A molding resin composition was prepared by mixing 20 percent of the liquid difurfuryl glutarate of Example I with 80 percent of aprepolymer comprising 35% furfuryl alcohol, 13% urea-formaldehyde resin containing 20% nitrogen and 52% of a phenol-formaldehyde resole resin.

A foundry-grade sand is then mixed with about 0.6 percent methyl ethyl ketone peroxide as a catalyst precursor. Then, 1.25 percent of the sand of 80/20 resin-ester mixture is added to the sand and peroxide and thoroughly mixed.

The resin composition-sand mixture is formed into test biscuits, simulating a foundry core or mold, and gassed with sulfur dioxide for about 0.5-5 seconds at a temperature of 80°-85° F. (26°-29° C.).

The test biscuits have tensile strengths after 24 hours which are better than the tensile strength of a control produced under the same conditions using the same resin prepolymer without the difurfuryl ester.

EXAMPLE 6

A molding resin composition was prepared by mixing 20 percent of the liquid difurfuryl glutarate of Example I with 80 percent of a phenol formaldehyde resin prepolymer.

A foundry-grade sand was then mixed with a benzene sulfonic acid catalyst in the amount of 45 percent of the resin composition to be added. The catalyst is a solution of 80% of the sulfonic acid, 10% methanol and 10% water. Then, 1.25 percent of the sand of 80/20 resin-ester mixture was added to the sand and catalyst and thoroughly mixed.

The resin composition-sand mixture was formed into test biscuits, simulating a foundry core or mold, and allowed to cure for 78 minutes at about 78° F. (25° C.).

The test biscuits have a tensile strength of 196 lbs. after 24 hours as compared with a tensile strength of 161 lbs. for a control produced under the same conditions using the same phenolic resin prepolymer without the difurfuryl ester. Substantially the same results are obtained using slightly greater amounts of te mixed methyl-furfuryl glutarate ester.

Other catalysts may be used with this resin composition, particularly those discussed in Example 1 above.

MOLDING COMPOSITIONS CONTAINING DIFURFURYL ADIPATE

EXAMPLE 7

A molding resin composition is prepared by mixing 30 percent of the liquid difurfuryl adipate of Example III with 70 percent of a phenol formaldehyde resin prepolymer.

A foundry-grade sand is then mixed with a benzene sulfonic acid catalyst in the amount of 45 percent of the resin composition to be added. The catalyst is a solution of 80% of the sulfonic acid, 10% methanol and 10% water. Then, 1.25 percent of the sand of 70/30 resin-ester mixture is added to the sand and catalyst and thoroughly mixed.

The resin composition-sand mixture is formed into test biscuits, simulating a foundry core or mold, and allowed to cure for 80 minutes at about 76° F. (25° C.).

The test biscuits have tensile strengths after 24 hours which are better than the tensile strength of a control produced under the same conditions using the same phenolic resin prepolymer without the difurfuryl ester. Substantially the same results are obtained using slightly greater amounts of the mixed methyl-furfuryl adipate ester.

Other catalysts may be used with this resin composition, particularly those discussed in Example 1 above.

MOLDING COMPOSITIONS CONTAINING DIFURFURYL SUCCINATE

EXAMPLE 8

A molding resin composition is prepared by mixing 20 percent of the liquid difurfuryl succinate of Example II with 80 percent of a phenol formaldehyde resin prepolymer.

A foundry-grade sand is then mixed with a benzen sulfonic acid catalyst in the amount of 45 percent of the resin composition to be added. The catalyst is a solution of 80% of the sulfonic acid, 10% methanol and 10% water. Then, 1.25 percent of the sand of 80/20 resin-ester mixture is added to the sand and catalyst and thoroughly mixed.

The resin composition-sand mixture is formed into test biscuits, simulating a foundry core or mold, and allowed to cure to 72 minutes at about 79° F. (26° C.).

The test biscuits have tensile strengths after 24 hours which are better than the tensile strength of a control produced under the same conditions using the same phenolic resin prepolymer without the difurfuryl ester. Substantially the same results are obtained using slightly greater amounts of the mixed methyl-furfuryl succinate ester.

Other catalysts may be use with this resin composition, particularly those discussed in Example 1 above.

MOLDING COMPOSITIONS CONTAINING MIXED DIFURFURYL ESTERS

EXAMPLE 9

A molding resin composition was prepared by mixing 20 percent of liquid difurfuryl esters of a mixture of glutaric, succinic and adipic acids with 80 percent of a phenol formaldehyde resin prepolymer.

A foundry-grade sand was then mixed with a benzene sulfonic acid catalyst in the amount of 45 percent of the resin composition to be added. The catalyst is a solution of 80% of the sulfonic acid, 10% methanol and 10% water. Then, 1.25 percent of the sand of 80/20 resin-ester mixture was added to the sand and catalyst and thoroughly mixed.

The resin composition-sand mixture was formed into test biscuits, simulating a foundry core or mold, and allowed to cure for 80 minutes at about 75° F. (24° C.).

The test biscuits have tensile strengths after 24 hours which are better than the tensile strength of a control produced under the same conditions using the same phenolic resin prepolymer without the difurfuryl esters. Substantially the same results are obtained using slightly greater amounts of the mixed methyl-furfuryl mixed acid esters.

Other catalysts may be used with this resin composition, particularly those discussed in Example 1 above.

MOLDING COMPOSITIONS CONTAINING DIFURFURYL MALONATE

EXAMPLE 10

A molding resin composition is prepared by mixing 25 percent of the liquid difurfuryl malonate of Example IV with 75 percent of a phenol formaldehyde resin prepolymer.

A foundry-grade sand is then mixed with a benzene sulfonic acid catalyst in the amount of 45 percent of the resin composition to be added. The catalyst is a solution ob 80% of the sulfonic acid, 10% methanol and 10% water. Then, 1.25 percent of the sand of 75/25 resin-ester mixture is added to the sand and catalyst and thoroughly mixed.

The resin composition-sand mixture is formed into test biscuits, simulating a foundry core or mold, and allowed to cure for 74 minutes at about 78° F. (26° C.).

The test biscuits have tensile strengths after 24 hours which are better than the tensile strength of a control produced under the same conditions using the same phenolic resin prepolymer without the difurfuryl ester. Substantially the same results are obtained using slightly greater amounts of the mixed methyl-furfuryl malonate ester.

Other catalysts may be used with this resin composition, particularly those discussed in Example 1 above.

MOLDING COMPOSITIONS CONTAINING DIFURFURYL PIMELATE

EXAMPLE 11

A molding resin composition is prepared by mixing 15 percent of the liquid difurfuryl pimelate of Example V with 85 percent of a phenol formaldehyde resin prepolymer.

A foundry-grade sand is then mixed with a benzene sulfonic acid catalyst in the amount of 45 percent of the resin composition to be added. The catalyst is a solution of 80% of the sulfonic acid, 10% methanol and 10% water. Then, 1.25 percent of the sand of 85/15 resin-ester mixture is added to the sand and catalyst and thoroughly mixed.

The resin composition-sand mixture is formed into test biscuits, simulating a foundry core or mold, and allowed to cure for 74 minutes at about 80° (27° C.).

The test biscuits have tensile strengths after 24 hours which are better than the tensile strength of a control produced under the same conditions using the same phenolic resin prepolymer without the difurfuryl ester. Substantially the same results are obtained using slightly greater amounts of the mixed methyl-furfuryl pimelate ester.

Other catalysts may be used with this resin composition, particularly those discussed in Example 1 above.

MOLDNG COMPOSITIONS CONTAINING DIFURFURYL SUBERATE

EXAMPLE 12

A molding resin composition is prepared by mixing 20% of the liuid difurfuryl suberate of Example VI with 80% of a phenol formaldehyde resin prepolymer.

A foundry-grade sand is then mixed with a benzene sulfonic acid catalyst in the amount of 45% of the resin composition to be added. The catalyst is a solution of 80% of the sulfonic acid, 10% methanol and 10% water. Then, 1.25% of the sand, of 80/20 resin-ester mixture is added to the sand and catalyst and thoroughly mixed.

The resin composition-sand mixture is formed into test biscuits, simulating a foundry core or mold, and allowed to cure for 70 minutes at about 82° F. (28° C.).

The test biscuits have tensile strengths after 24 hours which are better than the tensile strength of a control produced under the same conditions using the same phenolic resin prepolymer without the difurfuryl ester. Substantially the same results are obtained using slightly greater amounts of the mixed methyl-furfuryl suberate ester.

Other catalysts may be used with this resin composition, particularly those discussed in Example 1 above.

MOLDING COMPOSITIONS CONTAINING DIFURFURYL AZELATE

EXAMPLE 13

A molding resin composition is prepared by mixing 35% of the liquid difurfuryl azelate of Example VII with 65% of a phenol formaldehyde resin prepolymer.

A foundry-grade sand is then mixed with a benzene sulfonic acid catalyst in the amount of 45% of the resin composition to be added. The catalyst is a solution of 80% of the sulfonic acid, 10% methanol and 10% water. Then, 1.25% of the sand, of 65/35 resin-ester mixture is added to the sand and catalyst and thoroughly mixed.

The resin composition-sand mixture is formed into test biscuits, simulating a foundry core or mold, and allowed to cure for 78 minutes at about 78° F. (26° C.). The test biscuits have tensile strengths after 24 hours which are better than the tensile strength of a control produced under the same conditions using the same phenolic resin prepolymer without the difurfuryl ester. Substantially the same results are obtained using slightly greater amounts of the mixed methyl-furfuryl azelate ester.

Other catalysts may be used with this resin composition, particularly those discussed in Example 1 above.

MOLDING COMPOSITION CONTAINING DIFURFURYL SEBACATE

EXAMPLE 14

A molding resin composition is prepared by mixing 20% of the liquid difurfuryl sebacate of Example VIII with 80% of a phenol formaldehyde resin prepolymer.

A foundry-grade sand is then mixed with a benzene sulfonic acid catalyst in the amount of 45% of the resin composition to be added. The catalyst is a soltuion of 80% of the sulfonic acid, 10% methanol and 10% water. Then, 1.25% of the sand, of 80/20 resin-ester mixture is added to the sand and catalyst and thoroughly mixed.

The resing composition-sand mixture is formed into test biscuits, simulating a foundry core or mold, and allowed to cure for 78 minutes at about 78° F. (26° C.). The test biscuits have tensile strengths after 24 hours which are better than the tensile strength of a control produced under the same conditions using the same phenolic resin prepolymer without the difurfuryl ester. Substantially the same results are obtained using slightly greater amounts of the mixed methyl-furfuryl sebacate ester.

Other catalysts may be used with this resin composition, particularly those discussed in Example 1 above.

FURFURYL ALCOHOL PREPOLYMER COMPOSITIONS WITH METHYL-FURFURYL-GLUTARATE OR DIFURFURYL GLUTARATE

A series of experiments were carried out in which furfuryl glutarate esters were used to modify a starting acid curable furfuryl alcohol prepolymer comprising a mixture of about 82% furfuryl alcohol, about 9% of a phenol-formaldehyde resole resin, 8.68% urea-formaldehyde resin containing 20% nitrogen and a small amount of a silane coupling agent. The furfuryl glutarate esters were substituted for part of the furfuryl alcohol at various levels and the resulting compositions evaluated as foundry binders.

EXAMPLE 15

A molding resin composition was prepared by replacing 13% of the furfuryl alcohol in the above starting prepolymer with a 50/50 mixture of difurfuryl glutarate and methyl-furfuryl glutarate. A Manley 1-L Lake sand was then mixed with a sulfonic acid catalyst in the amount of 25% of the resin composition to be added. The catalyst used in this example comprised a mixture of 50% benzene sulfonic acid, 30% sulfuric acid, 10% methanol and 10% water. Then, 1.25% of the sand, of the resin-ester mixture was added to the sand and catalyst and thoroughly mixed.

The resin composition-sand mixture was formed into test biscuits, simulating a foundry core or mold, and allowed to cure for 27 minutes at about 80° F. (27° C.).

The test biscuits had a tensile strength of 143 psi after 2 hours and 190 psi after 24 hours. Core hardness was 66 after 2 hours and 67 after 24 hours.

A control experiment was carried out using the same modified furfuryl alcohol resin composition without the furfuryl ester addition. This resin prepolymer was added to the same sand at a concentration of 1.25%. The sand was pretreated with a benzene sulfonic acid usually used for curing the furfuryl alcohol resins in the amount of 30% based on the amount of resin to be added.

The control composition was formed into test biscuits, simulating a foundry core or mold, and allowed to cure for 33 minutes at about 80° F. (27° C.).

The test biscuits had a tensile strength of 142 psi after 2 hours and 160 psi after 24 hours. The core hardness was 66 after 2 hours and 62 after 24 hours.

Substantially the same results are obtained using the mixed difurfuryl glutarate ester in like amounts.

Other catalysts can be used in forming the test biscuits which are customarily used in curing sand cores and molds. The aromatic sulfonic acids, including benzene sulfonic acid, toluene sulfonic acid, exylene sulfonic acid, and mixtures thereof, either along or diluted with water and/or methanol or other diluents. Sometimes fluoboric acid or sulfuric acid may be added.

EXAMPLE 16

A molding resin composition was prepared by replacing 21% of the furfuryl alcohol in the above starting prepolymer with a 50/50 mixture of difurfuryl glutarate and methyl-furfuryl glutarate. A Manley 1-L Lake sand was then mixed with the modified sulfonic acid catalyst of Example 15 in the amount of 30% of the resin composition to be added. Then, 1.25% of the sand, of the resin-ester mixture was added to the sand and catalyst and thoroughly mixed.

The resin composition-sand mixture was formed into test biscuits, simulating a foundry core or mold, and allowed to cure for 15 minutes at about 80° F. (27° C.).

The test biscuits had a tensile strength of 158 psi after 2 hours and 173 psi after 24 hours. Core hardness was 73 after 2 hours and 72 after 24 hours.

A control experiment was carried out using the same modified furfuryl alcohol resin composition without the furfuryl ester addition. This resin prepolymer was added to the same sand at a concentration of 1.25% based on sand. The sand was pretreated with a benzene sulfonic acid usually used for curing the furfuryl alcohol resins in the amount of 40% based on the amount of resin to be added.

The control composition was formed into test biscuits, simulating a foundry core or mold, and allowed to cure for 18 minutes at about 80° F. (27° C.).

The test biscuits had a tensile strength of 155 psi after 2 hours and 174 after 24 hours. The core hardness was 63 after 2 hours and 64 after 24 hours.

Substantially the same results are obtained using the mixed difurfuryl glutarate ester in like amounts.

EXAMPLE 17

A molding resin composition was prepared by replacing 30% of the furfuryl alcohol in the above prepolymer with a 50/50 mixture of difurfuryl glutarate and methyl-furfuryl glutarate. A Manley 1-Lake sand was then mixed with the modified sulfonic acid catalyst of Example 15 in the amount of 30% of the resin composition to be added. Then, 1.25% of the sand, of the resin-ester mixture was added to the sand and catalyst and thoroughly mixed.

The resin composition-sand mixture was formed into test biscuits, simulating a foundry core or mold, and allowed to cure for 18 minutes at about 80° F. (27° C.).

The test biscuits had a tensile strength of 164 psi after 2 hours and 206 psi after 24 hours. Core hardness was 80 after 2 hours and 70 after 24 hours.

A control experiment was carried out using the same modified furfuryl alcohol resin composition without the furfuryl ester addition. This resin prepolymer was added to the same sand at a concentration of 1.25% based on sand. The sand was pretreated with a benzene sulfonic acid usually used for curing the furfuryl alcohol resins in the amount of 35% based on the amount of resin to be added.

The control composition was formed into test biscuits, simulating a foundry core or mold, and allowed to cure for 22 minutes at about 80° F. (27° C.).

The test biscuits had a tensile strength of 145 psi after 2 hours and 183 psi after 24 hours. The core hardness was 68 after 2 hours and 62 after 24 hours.

EXMAPLE 18

A molding resin composition was prepared replacing 50% of the furfuryl alcohol in the above starting prepolymer with a 50/50 mixture of difurfuryl glutarate and methyl-furfuryl glutarate. A Manley 1-L Lake sand was then mixed with the modified sulfonic acid catalyst of Example 15 in the amount of 35% of the resin composition to be added. Then, 1.25% of the sand, of the resin-ester mixture was added to the sand and catalyst and thoroughly mixed.

The resin compsition-sand mixture was formed into test biscuits,simulating a foundry core or mold, and allowed to cure for 18 minutes at about 80° F. (27° C.).

The test biscuits had a tensile strength of 101 psi after 2 hours and 183 psi after 24 hours. Core hardness was 79 after 2 hours and 74 after 24 hours.

A control experiment was carried out using the same modified furfuryl alcohol resin composition without the furfuryl ester addition. This resin prepolymer was added to the same sand at a concentration of 1.25% based on sand. the sand was pretreated with a benzene sulfonic acid usually used for curing the furfuryl alcohol resins in the amount of 40% based on the amount of resin to be added.

The control composition was formed into test biscuits, simulating a foundry core or mold, and allowed to cure for 21 minutes at about 80° F. (27° C.).

The test biscuits had a tensile strength of 178 psi after 2 hours and 192 psi after 24 hours. The core hardness was 84 after 2 hours and 66 after 24 hours.

Substantially the same results are obtained using the mixed difurfuryl glutarate ester in like amounts.

The above series of experiments was carried out using the furfuryl glutarate esters for admixture with furfuryl alcohol type condensation or acid curable resins. The other furfuryl esters of dibasic acids may be used in like manner.

USE OF FURFURYL GLUTARATE ESTERS AS BINDER RESINS

Further experiments were carried out in which furfuryl glutarate diesters were used, per se, as resin binders. These esters are acid curable and can be used to bind foundry sand although improved results are obtained when the diesters are admixed with other resins.

EXAMPLE 19

A Weldron 5040 sand was mixed with the modified sulfonic acid catalyst of Example 15 in the amount of 25% by weight of the resin composition to be added. Then, 1.25% based on the weight of the sand, of a 50/50 mixture of methyl-furfuryl glutarate and difurfuryl glutarate was added to the sand and catalyst and thoroughly mixed.

The resin composition-sand mixture was formed into test biscuits, simulating a foundry core or mold, and allowed to cure for 17 minutes at about 80° F. (27° C.).

The test biscuits had a tensile strength of 54 psi after 2 hours and 61 psi after 24 hours. Core hardness was 24 after 2 hours and 30 after 24 hours.

Other catalysts such as those listed in Example 1 above can be used in forming the test biscuits.

While this invention has been described fully and completely with special emphasis upon several preferred embodiments, it should be understood that within the scope of the appended claims this invention may be practiced otherwise than as specifically described herein.

I claim:

1. An acid-curable binder composition comprising
   (a) a furfuryl alcohol prepolymer, and
   (b) a dibasic acid diester of the composition

$R^1O_2C(CH_2)_nCO_2R^2$ wherein n is from 1 to 8, $R^1$ is a furfuryl group, and $R^2$ is a furfuryl group or a methyl group.

2. A binder composition according to claim 1 in which the furfuryl alcohol prepolymer comprises furfuryl alcohol, polyfurfuryl alcohol, mixtures of furfuryl alcohol and polyfurfuryl alcohol, a furfuryl alcohol-formaldehyde condensate or a mixture of furfuryl alcohol and a furfuryl alcohol-formaldehyde condensate.

3. A binder composition in accordance to claim 1 also containing other acid-curable condensation resins.

4. The composition of claim 3 wherein the other condensation resins comprise phenol-formaldehyde precondensate resins, urea-formaldehyde precondensate resins, furan precondensate resins and mixtures or copolymers thereof.

5. A binder composition in accordance with claim 4 comprising a mixture of furfuryl alcohol or polyfurfuryl alcohol and a phenol-formaldehyde precondensate resin.

6. The binder composition according to claim 5 also containing a urea-formaldehyde precondensate resin.

7. A binder composition according to claim 1 wherein said dibasic acid diester is a mixtue of dibasic acid diesters wherein n is a plurality of numbers from 1 to 8 and $R^2$ is a mixture of furfuryl and methyl groups.

8. A binder compostion in accordance with claim 4 comprising furfuryl alcohol and from about 10 to about 75 percent by weight of at least one of said pecondensate resins.

9. An acid-curable molding composition comprising
(a) a major amount of a solid particulate material, and
(b) a minor amount of an acid-curable binder composition comprising
(i) a dibasic diester having the formula $$R^1O_2C(CH_2)_nCO_2R^2$$

wherein n is from 1 to 8, $R^1$ is a furfuryl group, and $R^2$ is a furfuryl group or a methyl group, or
(ii) a mixture comprising said dibasic acid diester and an acid-curable furfuryl alcohol prepolymer.

10. The molding composition according to claim 9 in which said solid particulate material is a foundry grade sand.

11. The molding composition in accordance with claim 9 wherein the binder composition (ii) comprises a mixture of said diester, furfuryl alcohol and a phenol-formaldehyde, urea-formaldehyde or phenol-urea-formaldehyde precondensate resin.

12. A method of forming shaped, filled bodies comprising inorganic solid particulate material and a binder which comprises the steps of
(a) preparing a mixture comprising a major amount of a solid particulate material and a minor amount of a binder composition comprising
(i) a dibasic diester having the formula $$R^1O_2C(CH_2)_nCO_2R^2$$

whrein n is from 1 to 8, $R^1$ is a furfuryl group, and $R^2$ is a furfuryl group or a methyl group, or
(ii) a mixture comprising said dibasic acid diester and an acid-curable furfuryl alcohol prepolymer.
(b) forming said mixture into the desired shape, and
(c) curing said binder with an acid.

13. The method of claim 12 wherein the acid is included in the binder composition.

14. The mehtod claim 13 wherein the acid is an aromatic sulfonic acid.

15. The method of claim 13 wherein the binder composition also cntains from about 10 to 75% of at least one precondensate resin selected from the group consisting of phenol-formaldehyde, urea-formaldehyde and furan precondensate resins, and mixtures and copolymers thereof.

16. The method of forming shaped, filled bodies comprising inorganic solid particulate material and a binder which comprises the steps of
(a) preparing a mixture comprising a major amount of an inorganic solid particulate material and a minor amount of a binder composition comprising (i) a dibasic diester having the formula $$R^1O_2C(CH_2)_nCO_2R^2$$

wherein n is from 1 to 8, $R^1$ is a furfuryl group, and $R^2$ is a furfuryl group or a methyl group, or
(ii) a mixture comprising said dibasic acid diester and an acid-curable furfuryl alcohol prepolymer; and
(iii) an oxidizing agent capable of reacting with sulfur dioxide to form a catalyst for curing said binder composition,
(b) forming said mixture into the desired shape, and
(c) contacting the shaped mixture with sulfur dioxide for a period of time sufficient to effect cure of the binder.

17. The method of claim 16 wherein the furfuryl alcohol prepolymer comprises a mixture of furfuryl alcohol or polyfurfuryl alcohol and a phenol-formaldehyde precondensate resin, a urea-formaldehyde precondensate resin or mixtures of such resins.

18. The method of claim 16 wherein the diester is a mixture of dibasic acid diesters wherein n is a plurality of numbers from 1 to 8 and $R^2$ is a mixture of furfuryl and methyl groups.

19. The method of claim 16 wherein the oxidizing agent is a peroxide.

20. The method of forming shaped filled bodies comprising the steps of
(a) preparing a mixture comprising a major amount of a solid particulate material and a minor amount of a binder composition comprising
(i) a dibasic acid diester of the formula $$R^1O_2C(CH_2)_nCO_2R^2$$

wherein n is from 1 to 8, $R^1$ is a furfuryl group, and $R^2$ is a furfuryl group or a methyl group, and
(ii) an oxidizing agent capable of reacting with sulfur dioxide to form a catalyst for curing said diester,
(b) forming said mixture into the desired shape, and
(c) contacting the shaped mixture with sulfur dioxide for a period of time sufficient to effect cure of the diester.

21. A sand core or mold comprising a shaped, filled body comprising an inorganic solid particulate material and a cured binder composition comprising an acid cured
(a) dibasic diester having the formula $$R^1O_2C(CH_2)_nCO_2R^2$$

wherein n is from 1 to 8, $R^1$ is a furfuryl group and $R^2$ is a furfuryl or a methyl group, or
(b) mixture comprising said dibasic acid diester and a furfuryl alcohol prepolymer.

22. The core or mold of claim 21 wherein the furfuryl alcohol prepolymer comprises a furfuryl alcohol, polyfurfuryl alcohol, a mixture of furfuryl alcohol and polyfurfuryl alcohol, a furfuryl alcohol-formaldehyde condensate or a mixtue of furfuryl alcohol and a furfuryl alcohol-formaldehyde precondensate.

23. The sand core or mold of claim 21 wherein the cured binder composition also comprises at least one cured phenol-formaldehyde, urea-formaldehyde or furan resin or mixtures and copolymers thereof.

* * * * *